(12) United States Patent
Lenz

(10) Patent No.: US 12,428,756 B2
(45) Date of Patent: Sep. 30, 2025

(54) PARTICLE-IMBEDDED SERVING YARN FOR CMC APPLICATIONS

(71) Applicant: Raytheon Technologies Corporation, Farmington, CT (US)

(72) Inventor: Brendan Lenz, Wethersfield, CT (US)

(73) Assignee: RTX Corporation, Farmington, CT (US)

( * ) Notice: Subject to any disclaimer, the term of this patent is extended or adjusted under 35 U.S.C. 154(b) by 442 days.

(21) Appl. No.: 17/842,700

(22) Filed: Jun. 16, 2022

(65) Prior Publication Data
US 2023/0407532 A1    Dec. 21, 2023

(51) Int. Cl.
| | | |
|---|---|---|
| C04B 35/00 | (2006.01) | |
| C04B 35/10 | (2006.01) | |
| C04B 35/565 | (2006.01) | |
| C04B 41/45 | (2006.01) | |
| D03D 15/242 | (2021.01) | |
| D03D 15/40 | (2021.01) | |
| D06M 11/46 | (2006.01) | |
| D06M 11/58 | (2006.01) | |
| D06M 11/74 | (2006.01) | |

(52) U.S. Cl.
CPC ........... *D03D 15/242* (2021.01); *C04B 35/10* (2013.01); *C04B 35/565* (2013.01); *C04B 41/4531* (2013.01); *D03D 15/40* (2021.01); *D06M 11/46* (2013.01); *D06M 11/58* (2013.01); *D06M 11/74* (2013.01); *C04B 2235/3217* (2013.01); *C04B 2235/3826* (2013.01)

(58) Field of Classification Search
None
See application file for complete search history.

(56) References Cited

U.S. PATENT DOCUMENTS

| | | | | |
|---|---|---|---|---|
| 1,101,779 | A | * | 6/1914 | Becker ................. F23D 11/04 239/214.21 |
| 10,464,850 | B2 | | 11/2019 | Jarmon et al. |
| 10,822,282 | B2 | | 11/2020 | Schmidt et al. |
| 2019/0177240 | A1 | * | 6/2019 | Harris ................... D02J 13/00 |
| 2021/0009480 | A1 | | 1/2021 | Whitmore et al. |

FOREIGN PATENT DOCUMENTS

| | | | | | |
|---|---|---|---|---|---|
| FR | | 3039149 A1 | * | 1/2017 | ............. C04B 30/02 |
| FR | | 3101629 A1 | | 4/2021 | |
| WO | WO-2020209848 A1 | * | 10/2020 | | |

OTHER PUBLICATIONS

Extended European Search Report for EP Application No. 23179766.3, dated Apr. 9, 2024, 11 pages.
Partial European Search Report for EP Application No. 23179766.3, dated Dec. 15, 2023, 11 pages.

* cited by examiner

*Primary Examiner* — David P Turocy
(74) *Attorney, Agent, or Firm* — Kinney & Lange, P.A.

(57) ABSTRACT

A method of preparing a fibrous preform for use in a ceramic matrix composite comprises coiling a serving yarn around a ceramic tow to form a served tow, the serving yarn comprising a polymer material with embedded ceramic particles, incorporating the served tow into a woven fabric, the woven fabric comprising a plurality of served tows, and removing the polymer material of the serving yarn such that the embedded ceramic particles remain in the woven fabric.

10 Claims, 4 Drawing Sheets

PARTICLE-IMBEDDED SERVING YARN FOR CMC APPLICATIONS

BACKGROUND

The present invention relates to ceramic matrix composites, and more particularly, to the preparation of woven ceramic fabrics for use in ceramic matrix composites.

In the processing of ceramic matrix composites, there is a need to infiltrate matrix within and around fibrous tow bundles to replace pore volume with dense matrix material. In a woven system, there are often large voids that exist between adjacent tows of a preform. After infiltration, such voids can become large defects of the composite that are detrimental to composite properties. Particles can be added to a preform to occupy these large voids and reduce the volume fraction of defects in the composite. Introducing particles to ceramic fabrics in such manner as to provide a uniform distribution of particles using current methods (e.g., spraying, dunking, ultrasonication, etc.) can be challenging due to the lack of control of particles in a free-flowing solution state of matter. Thus, improved methods of particle deposition are desirable.

SUMMARY

A method of preparing a fibrous preform for use in a ceramic matrix composite comprises coiling a serving yarn around a ceramic tow to form a served tow, the serving yarn comprising a polymer material with embedded ceramic particles, incorporating the served tow into a woven fabric, the woven fabric comprising a plurality of served tows, and removing the polymer material of the serving yarn such that the embedded ceramic particles remain in the woven fabric.

A fibrous ceramic preform comprises a woven fabric formed from a plurality of ceramic tows, and ceramic particles deposited on the woven fabric. The percent by volume of ceramic particles in the preform ranges from 2% to 20%.

Figure 1:
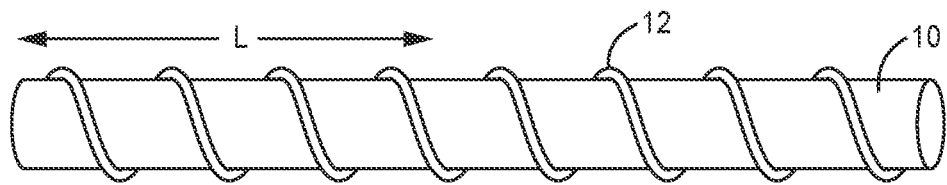
FIG. 1 is a simplified perspective view of a ceramic tow with a serving yarn wrapped around its outer surface.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents a method of and means for introducing particles into a fibrous ceramic preform.

Figure 2:
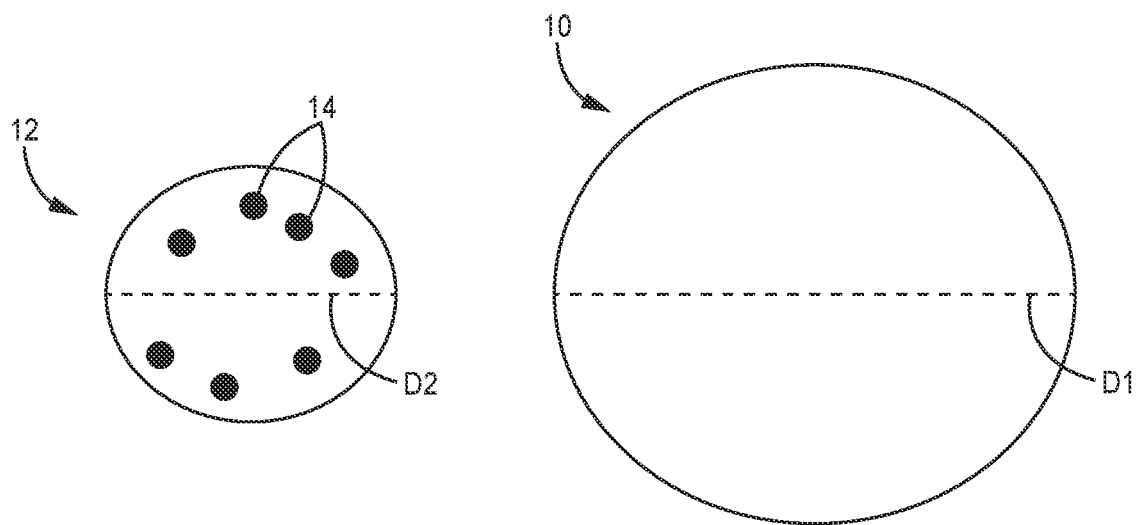
FIG. 2 is a simplified cross-sectional side-by-side comparison of the serving yarn and ceramic tow.
Figure 3:
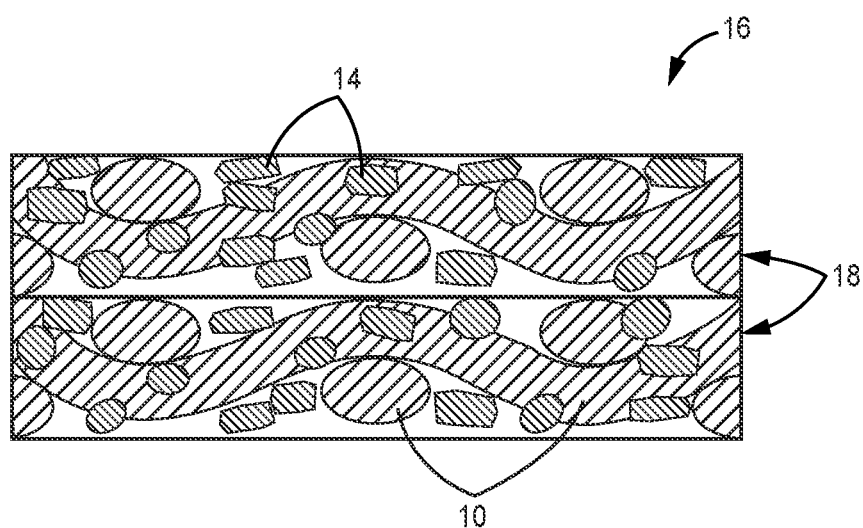
FIG. 3 is a simplified cross-section view of a portion of a ceramic preform after the serving yarns have been decomposed from the ceramic tows, leaving particles behind in the open spaces of the preform.
Figure 4:
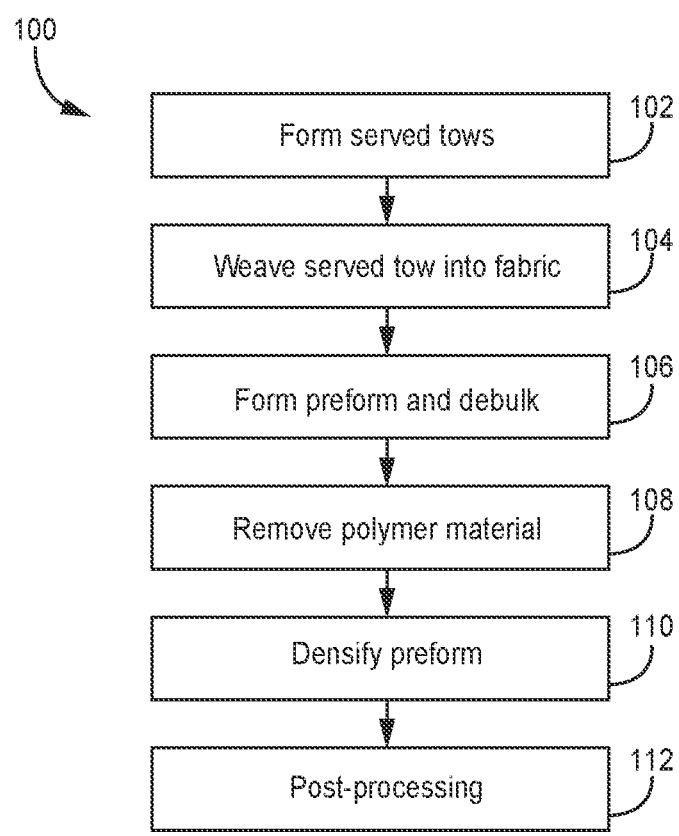
FIG. 4 is a flow chart illustrating a method of depositing the particles in the preform using serving yarns.

FIG. 1 is a simplified illustration of ceramic tow 10 wrapped with serving yarn 12. FIG. 2 is a simplified side-by-side cross-sectional view of tow 10 and serving yarn 12. FIG. 3 is simplified cross-sectional view of a section of fibrous preform 16 after the removal of serving yarns 12, leaving behind particles 14. FIG. 4 is a method flowchart illustrating select steps of method 100 for preparing a ceramic preform with deposited particles 14. Steps 102-112 of method 100 are discussed together with FIGS. 1-3.

Ceramic tow 10 can be formed from bundled filaments of silicon carbide (SiC) or, in an alternative embodiment, aluminum oxide ($Al_2O_3$). Numerous tows 10 can be woven into two or three-dimensional fabrics or braids and incorporated into a preform (shown and labeled in FIG. 3). Serving yarn 12 can be formed from a polymer material, such as from a mixture of polyvinyl alcohol (PVA) and water. Other polymers are contemplated herein. The percent by weight of PVA in solution can be relatively high (e.g., ≥75%) in order to form a continuous yarn via extrusion or other suitable method. Additionally, the polymer material and method of yarn formation should be appropriate for forming a yarn flexible enough to be coiled around tow 10.

Prior to formation of serving yarn 12, particles 14 can be added to the PVA solution to create a serving yarn mixture. Exemplary particles 14 can be formed from a ceramic material, such as SiC, boron nitride (BN), boron carbide ($B_4C$), zirconium dioxide ($ZrO_2$), and silicon nitride ($Si_3N_4$) to name a few, non-limiting examples. Particle loading can be such that the percent by volume of particles 14 in a given serving yarn 12 can range from 5% to 25%. In one embodiment, the D50 size of ceramic particles 14 can range from 10 microns to 60 microns, and more specifically, from 35 microns to 50 microns. Particles 14 within a given mixture can be homogenous with respect to particle material, or can be a mixture of particles 14 of different materials in some embodiments. Tow 10 can have diameter D1 and serving yarn 12 can have a smaller diameter D2. In an exemplary embodiment, D2 can be roughly 25% to 50% the value of D1. In an exemplary embodiment, D2 can range from 100 microns to 300 microns. For more elliptical tows 10 and/or yarns 12, D1 and D2 can represent the major diameters, respectively.

At step 102, serving yarn 12 can be coiled/wound around tow 10 to form a served tow 10. More specifically, serving yarn 12 can be wound such that there are n coils per unit length L of tow 10. Length L can represent all, or just a portion, as shown, of the length of tow 12. A coil can represent each segment of serving yarn 12 fully circumscribing tow 10. FIG. 1 illustrates an embodiment with about four coils per until length L, or 4/L. The number of coils can depend on several factors, including the yarn diameter D2 and particle loading of serving yarn 12. For example, a larger value D2 may prevent tight winding of serving yarn 12, which can reduce the number of coils per length L, particularly for smaller values of L. Similarly, higher particle loading values can reduce the number of turns needed, regardless of D2. This is due to the fact that the desired volume fraction, or percent by volume of particles 14 delivered to tow 10 can be achieved with less (i.e., shorter overall length or smaller diameter) serving yarn 12. In an exemplary embodiment, length L can be 1.0 inch, and the number of coils per 1.0 inch can range from 1-100.

At step 104, served tow 10 can be woven into a fabric with other served and/or unserved tows 10. Generally speaking, the number of served tows 10 per unit area of a fabric will depend upon the desired volume percent of particles 14 in the fabric and/or preform, as is discussed in greater detail below with respect to FIG. 3. Additionally, "tighter" woven architectures, such as those with higher values for ends-per-inch (EPI) and/or picks-per-inch (PPI), may be better suited for alternating served and unserved tows 10, such as every other tow 10 in a particular direction, only warp tows 10, etc.

At step 106, served fabrics (i.e., those containing served tows 10) can then be laid up into a net shape or near-net-shape preform and debulked. More specifically, the preform can be placed, for example, on a vacuum debulking table or in an autoclave under pressure, and optionally, relatively low heat (e.g., ranging from 100° F. to 300° F.) can be applied.

At step 108, the polymer material of serving yarns 12 can be removed/decomposed. In one embodiment, the preform can be immersed in a vat of deionized water at or above boiling temperature (212° F. or 100° C.) to decompose the polymer material. Alternatively, the preform can be heated for a period of time, for example, to a temperature ranging from 700° F. to 800° F. (371° C. to 427° C.) for a number of hours to burn off the polymer material.

FIG. 3 illustrates a portion of preform 16, after the polymer removal of step 108. As shown, preform 16 includes two woven fabric layers 18 of warp and weft tows 10. Particles 14 remain within the preform after the removal of the polymer material, and generally occupy open spaces between tows 10 (i.e., inter-tow pores). However, particles 14 on the lower end of the size distribution range (i.e., those near 10 microns) can be small enough to travel into spaces between filaments of a particular tow 10 (i.e., intra-tow pores). Layers 18 nearest a midplane of preform 16 at a given location can have a greater concentration/percent by volume of particles 14 than layer 18 at an outer surface in some embodiments. This allows for a more robust deposition of matrix in the inner layers 18 without canning off at outer layers 18, as the outer layers 18 can be slightly more porous prior to matrix formation. The percent by volume of particles 14 within preform 16 can range from 2% to 20%, with the percent by volume of fibers (i.e., tows 10) being around 40%.

At step 110, preform 16 can undergo matrix formation and densification within a reaction chamber using chemical vapor infiltration (CVI). During densification, the fabric layers 18 are infiltrated by reactant vapors, and a gaseous precursor deposits on the underlying fibers. The matrix material can be SiC or other suitable ceramic material. Densification is carried out until the resulting CMC has reached the desired residual porosity. Other techniques for matrix formation are contemplated herein, such as one or a combination of slurry infiltration, melt infiltration, and polymer infiltration and pyrolysis.

At step 112, various post-processing steps can be performed, such as the application of one or more protective coatings (e.g., environmental and/or thermal barrier coatings). A bond coat can also be applied to facilitate bonding between the CMC and a protective coating. Other protective coatings, especially those suitable for use in a gas turbine engine environment, are contemplated herein.

A CMC formed with the disclosed perforated preforms can be incorporated into aerospace, maritime, or industrial equipment, to name a few, non-limiting examples.

Discussion of Possible Embodiments

The following are non-exclusive descriptions of possible embodiments of the present invention.

A method of preparing a fibrous preform for use in a ceramic matrix composite comprises coiling a serving yarn around a ceramic tow to form a served tow, the serving yarn comprising a polymer material with embedded ceramic particles, incorporating the served tow into a woven fabric, the woven fabric comprising a plurality of served tows, and removing the polymer material of the serving yarn such that the embedded ceramic particles remain in the woven fabric.

The method of the preceding paragraph can optionally include, additionally and/or alternatively, any one or more of the following features, configurations and/or additional components:

In the above method, the serving yarn can be coiled around the ceramic tow such that there are 1 to 100 coils per unit length of the ceramic tow.

In any of the above methods, the unit length can be 1.0 inch.

In any of the above methods, the polymer material can include polyvinyl alcohol.

In any of the above methods, the embedded ceramic particles can include at least one of silicon carbide, boron nitride, boron carbide, zirconium dioxide, and silicon nitride.

In any of the above methods, a size of the embedded ceramic particles can range from 10 microns to 60 microns.

In any of the above methods, a percent by volume of the embedded ceramic particles in the serving yarn can range from 5% to 25%.

In any of the above methods, the ceramic tow can have a first diameter, and the serving yarn can have a second diameter smaller than the first diameter.

In any of the above methods, the second diameter can range from 100 microns to 300 microns.

Any of the above methods can further include prior to decomposing the polymer material, laying up the woven fabric into the preform and debulking the preform.

In any of the above methods, removing the polymer material can include immersing the preform in boiling water, and heating the woven fabric to a temperature ranging from 700° F. and 800° F.

Any of the above methods can further include forming the ceramic matrix composite by densifying the preform using chemical vapor infiltration to deposit a ceramic matrix on and within the preform.

Any of the above methods can further include applying at least one of a thermal barrier coating and an environmental barrier coating to the ceramic matrix composite.

A fibrous ceramic preform comprises a woven fabric formed from a plurality of ceramic tows, and ceramic particles deposited on the woven fabric. The percent by volume of ceramic particles in the preform ranges from 2% to 20%.

The preform of the preceding paragraph can optionally include, additionally and/or alternatively, any one or more of the following features, configurations and/or additional components:

In the above preform, the ceramic tows can be formed from one of silicon carbide and aluminum oxide.

In the above preform, the ceramic particles can include at least one of silicon carbide, boron nitride, boron carbide, zirconium dioxide, and silicon nitride.

In the above preform, a size of the ceramic particles can range from 10 microns to 60 microns.

A ceramic matrix composite can include any of the above preforms and a ceramic matrix deposited on and around the woven fabric and ceramic particles.

In the above ceramic matrix composite, the ceramic matrix can include silicon carbide.

Any of the above ceramic matrix composites can further include at least one of a thermal barrier coating and an environmental barrier coating.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of preparing a fibrous preform for use in a ceramic matrix composite, the method comprising:
    coiling a serving yarn around an outer surface of a ceramic tow to form a served tow, the serving yarn comprising a polymer material with embedded ceramic particles and the ceramic tow formed of bundled ceramic filaments, wherein coiling the serving yarn comprises forming a plurality of coils disposed along a length of the ceramic tow, wherein each coil is a segment of the serving yarn fully circumscribing the ceramic tow;
    incorporating the served tow into a woven fabric, the woven fabric comprising a plurality of served tows; and
    removing the polymer material of the serving yarn such that the embedded ceramic particles remain in the woven fabric;
    wherein the embedded ceramic particles comprise at least one of silicon carbide, boron nitride, boron carbide, zirconium dioxide, and silicon nitride;
    wherein a size of the embedded ceramic particles ranges from 10 microns to 60 microns;
    wherein a percent by volume of the embedded ceramic particles in the serving yarn ranges from 5% to 25%; and
    wherein a percent by volume of the embedded ceramic particles in the serving yarn is greater at a midplane of the preform than at an outer surface of the preform.

2. The method of claim 1, wherein the serving yarn is coiled around the ceramic tow such that there are 1 to 100 coils per unit length of the ceramic tow.

3. The method of claim 2, wherein the unit length is 1.0 inch.

4. The method of claim 1, wherein the polymer material comprises polyvinyl alcohol.

5. The method of claim 1, wherein the ceramic tow has a first diameter, and the serving yarn has a second diameter, the second diameter being 25% to 50% of the first diameter, and the second diameter ranging from 100 microns to 300 microns.

6. The method of claim 1 and further comprising: prior to removing the polymer material, laying up the woven fabric into the preform and debulking the preform.

7. The method of claim 6, wherein removing the polymer material comprises heating the woven fabric to a temperature ranging from 700° F. and 800° F.

8. The method of claim 6, wherein removing the polymer material comprises immersing the preform in boiling water.

9. The method of claim 1 and further comprising: forming the ceramic matrix composite by densifying the preform using chemical vapor infiltration to deposit a ceramic matrix on and within the preform.

10. The method of claim 9 and further comprising: applying at least one of a thermal barrier coating and an environmental barrier coating to the ceramic matrix composite.

* * * * *